United States Patent
Lottes et al.

(10) Patent No.: US 11,820,231 B2
(45) Date of Patent: Nov. 21, 2023

(54) VEHICLE WITH A COMPARTMENT, AN OPERATING DEVICE AND AN ELECTRONIC CONTROL UNIT

(71) Applicant: AUDI AG, Ingolstadt (DE)

(72) Inventors: Daniel Lottes, Ihrlerstein (DE); Christian Wall, Hitzhofen (DE); Romain Diboine, Seoul (KR); Doh Yeon Kim, Seoul (KR); Seonghwan Kim, Seoul (KR)

(73) Assignee: AUDI AG, Ingolstadt (DE)

( * ) Notice: Subject to any disclaimer, the term of this patent is extended or adjusted under 35 U.S.C. 154(b) by 100 days.

(21) Appl. No.: 17/416,100

(22) PCT Filed: Dec. 16, 2019

(86) PCT No.: PCT/EP2019/085341
§ 371 (c)(1),
(2) Date: Jun. 18, 2021

(87) PCT Pub. No.: WO2020/127042
PCT Pub. Date: Jun. 25, 2020

(65) Prior Publication Data
US 2022/0080831 A1 Mar. 17, 2022

(30) Foreign Application Priority Data
Dec. 19, 2018 (EP) .................... 18213943

(51) Int. Cl.
*B60K 37/02* (2006.01)
*G06F 3/048* (2013.01)
(Continued)

(52) U.S. Cl.
CPC .......... *B60K 37/02* (2013.01); *G06K 7/10019* (2013.01); *A45C 13/18* (2013.01);
(Continued)

(58) Field of Classification Search
CPC ............ B60K 37/02; B60K 2370/1438; B60K 2370/48; B60K 2370/52; B60K 2370/563;
(Continued)

(56) References Cited

U.S. PATENT DOCUMENTS

| 2007/0203641 A1 | 8/2007 | Diaz et al. |
| 2007/0276515 A1* | 11/2007 | Dorn ...................... B60K 37/06 700/83 |

(Continued)

FOREIGN PATENT DOCUMENTS

| DE | 10 2015 002 306 A1 | 8/2015 |
| DE | 10 2014 209 983 A1 | 12/2015 |

(Continued)

OTHER PUBLICATIONS

Extended European Search Report dated Jul. 25, 2019 for European Application No. 18213943.6.
(Continued)

*Primary Examiner* — Douglas M Wilson
(74) *Attorney, Agent, or Firm* — STAAS & HALSEY LLP

(57) ABSTRACT

A compartment in a vehicle can be loaded by an object and an operating device having a user interface configured to output at least one output signal on a part of the user interface. The operating device is designed to cover the compartment. The compartment includes a sensing unit configured to detect the presence of the object when at least a part of the object is loaded into the compartment and the
(Continued)

operating device includes control circuitry configured to display a digital image of the object on a part of the user interface.

17 Claims, 2 Drawing Sheets

(51) Int. Cl.
    *B60R 11/00*     (2006.01)
    *H04W 4/80*     (2018.01)
    *G08B 21/24*     (2006.01)
    *A45C 13/18*     (2006.01)
    *G06K 7/10*     (2006.01)
    *G06F 1/16*     (2006.01)

(52) U.S. Cl.
    CPC .. *B60K 2370/1438* (2019.05); *B60K 2370/48* (2019.05); *B60K 2370/52* (2019.05); *B60K 2370/56* (2019.05); *B60K 2370/563* (2019.05); *B60K 2370/573* (2019.05); *B60K 2370/577* (2019.05); *B60K 2370/834* (2019.05); *B60R 2011/0075* (2013.01); *B60Y 2200/11* (2013.01); *G06F 1/1632* (2013.01); *G06F 3/048* (2013.01); *G08B 21/24* (2013.01); *H04W 4/80* (2018.02)

(58) Field of Classification Search
    CPC .............. B60K 2370/577; B60K 37/06; B60K 2370/56; B60K 2370/573; B60K 2370/834; G06K 7/10019; B60Y 2200/11; G06F 1/1632; G06F 3/048; B60R 2011/0075; H04W 4/80; A45C 13/18; G08B 21/24
See application file for complete search history.

(56) References Cited

U.S. PATENT DOCUMENTS

| | | | | |
|---|---|---|---|---|
| 2008/0284198 | A1* | 11/2008 | Ryu | B60R 11/0235 296/70 |
| 2014/0277937 | A1* | 9/2014 | Scholz | G06F 7/00 701/1 |
| 2015/0002991 | A1* | 1/2015 | Vander Sluis | B60K 35/00 361/679.01 |
| 2015/0127215 | A1* | 5/2015 | Chatterjee | B60H 1/00642 701/1 |
| 2017/0132905 | A1* | 5/2017 | Rudolph | H04W 4/80 |
| 2017/0297430 | A1* | 10/2017 | Hori | H04B 1/3822 |
| 2018/0018289 | A1 | 1/2018 | Preussler et al. | |
| 2019/0155341 | A1* | 5/2019 | Sobel | G06F 11/3062 |
| 2019/0346531 | A1* | 11/2019 | Apostolos | B60R 25/209 |

FOREIGN PATENT DOCUMENTS

| | | | |
|---|---|---|---|
| DE | 10 2014 014 412 A1 | 3/2016 | |
| DE | 102016001226 A1 * | 8/2017 | |
| DE | 102017200711 A1 * | 7/2018 | |
| EP | 18213943.6 | 12/2018 | |
| EP | PCT/EP2019/085341 | 12/2019 | |
| FR | 2910860 A1 * | 7/2008 | ............. B60K 35/00 |

OTHER PUBLICATIONS

International Search Report dated Feb. 11, 2020 for International Application No. PCT/EP2019/085341.
Translation by WIPO of International Preliminary Report on Patentability for PCT/EP2019/085341 dated Jun. 16, 2021, 8 pp.

* cited by examiner

VEHICLE WITH A COMPARTMENT, AN OPERATING DEVICE AND AN ELECTRONIC CONTROL UNIT

CROSS REFERENCE TO RELATED APPLICATIONS

This application is a U.S. national stage of International Application No. PCT/EP2019/085341, filed on Dec. 16, 2019. The International Application claims the priority benefit of European Application No. 18213943.6 filed on Dec. 16, 2018. Both the International Application and the European Application are incorporated by reference herein in their entirety.

BACKGROUND

Described below is a vehicle having a compartment and an operating device with a user interface that is controlled by an electronic control unit.

A vehicle nowadays usually includes a display panel or a touchscreen which is generally of a large size and is placed on and/or integrated in the dashboard of the vehicle. This enables a user or a driver of the vehicle to communicate with and/or operate other devices in the vehicle through the display panel or the touchscreen. The user or the driver can communicate with the other devices through the display panel or the dashboard by touch or voice signals. However, other computing devices such as a smartphone of the user are usually loaded at a different location in the vehicle in a loading chamber. The smartphone of the user is usually connected to the display panel or the touchscreen by a wireless connection or a wired connection in such a manner that a display of the smartphone is displayed on the display panel or the touchscreen in a different form, so that the user can communicate with his smartphone through the display panel or the touchscreen. However, the form of the display of the smartphone on the display panel or the touchscreen is much different to the original display of the smartphone. Furthermore, the user often forgets to remove or pick up his smartphone from the loading chamber at the time of exit from the vehicle, since the smartphone is loaded at a different location in the vehicle.

Document DE 10 2015 002 306 A1 discloses a stowage device for an interior of a motor vehicle with at least one storage compartment for receiving objects, and with at least one cover associated with the storage compartment. By the at least one cover, the storage compartment is at least partially closable, wherein the cover has at least one partial area with an adjustable light transmission. The document further discloses a method for monitoring at least one storage compartment arranged in an interior of a motor vehicle. However, the document does not disclose any virtual representation of a smartphone on the at least one cover. However, a display of the display of a smart phone in the at least one cover is not disclosed.

Document DE 10 2014 209 983 A1 discloses an operator control device in a vehicle and a mobile unit, wherein the mobile unit is controlled by the operator control device by a proximity sensor. In this case, a user surface of the mobile unit is transmitted to a display of the operator control device by an interface. On the display, the user surface can control the mobile unit by a proximity sensor, wherein a processing device of the mobile unit can be designed such that specific operator control elements are displayed on the user surface on an enlarged scale. However, a storage device to store the mobile unit is not disclosed.

Document DE 10 2014 014 412 A1 discloses a motor vehicle, comprising an operating device with a touchscreen having luminous pixel elements, and a control device which is designed for this purpose, in a first operating mode, to display the graphical user interface on the touchscreen using the pixel elements and, depending on a touch signal of the touchscreen to control at least one device of the motor vehicle other than the operating device by a control signal. However, a storage device to store the mobile unit is not disclosed.

SUMMARY

A compartment in a vehicle for storing an object and a visualization of the object on a user interface are provided.

Described herein is a vehicle with a compartment designed to be loaded by an object. For example, the compartment can be a part of a dashboard of the vehicle. The compartment may be located and/or integrated in the dashboard in such a manner, that it is located at a reachable distance from a user, who can be a driver of the vehicle sitting on a front vehicle seat. This enables the user to load or place the object into the compartment while driving the vehicle manually and/or at the same time be able to reach the object the compartment by his hand while driving. The vehicle further includes an operating device having a user interface, wherein the user interface is designed to output at least one output signal on a part of the user interface. The operating device may be in the form of a touchscreen and the user interface may be in the form of a graphical user interface (GUI) of the touchscreen. The user interface, that is, for example, the graphical user interface of the operating device, may have a plurality of pixel elements. By the term pixel element, it is meant each pixel of a pixel matrix. A digital image can be formed or displayed using the pixel elements. The digital image may include logos and/or icons of apps, which are displayed on the user interface.

The operating device is arranged in front of the compartment and is designed to cover the compartment. In other words, the operating device may function as a lid or a door of the compartment. This is of advantage, because this enables a protection and/or safety of the object which is being loaded or is loaded or placed into the compartment in the vehicle. Moreover, it further enables to preserve space in the vehicle, since the object is placed inside the compartment, instead at separate predefined location in the vehicle, which in turn could lead to an occupation of space in the vehicle.

Furthermore, the compartment has a sensing unit, wherein the sensing unit is designed to detect a presence of the object when at least a part of the object is loaded into the compartment. Moreover, the operating device includes control circuitry, wherein the control circuitry is designed to display a digital image of the object on a part of the user interface. In other words, when the object is being loaded or is loaded or placed into the compartment or at least a part of the object is loaded or placed into the compartment, then the presence of the object is detected by the sensing unit and a detection signal is sent to the control circuitry of the operating device. Upon receiving the detection signal from the sensing unit the control circuitry is activated, which in turn can activate a camera attached to the control circuitry. The camera can capture an image of the loaded object or a part of the loaded object into the compartment and the image in form of a digital image can be transferred from the control circuitry to a part of the user interface. This is of advantage, because this enables the display of the digital image of the object loaded into the compartment on a part of the user interface. Hence, on one side the object can be placed in the compartment which enables the safety of the object at the same time enables to save space in the vehicle and on the other side, the object can be viewed by the digital image of the object on a part of the user interface. Furthermore, the object can be a smartphone of the user. In this case, it is further thinkable that a login profile of the user of the smartphone, can be stored in the control circuitry. When the smartphone is loaded into the compartment, then the login profile of the user can be identified by the control circuitry and a display content of a display panel of the smartphone of the user is displayed on a part of the user interface in form of a digital image.

In one embodiment, the operating device may be designed to output a pick-up message of the object loaded in the compartment on the user interface, wherein for triggering the pick-up message, an electronic control unit of the vehicle may be designed to send a remove signal to the control circuitry when a stoppage of the vehicle and/or an opening of the driver's door of the vehicle is detected. In other words, a corresponding notification signal is sent to the electronic control unit from a corresponding vehicle unit. The corresponding vehicle unit may be an engine unit which can send a notification signal notifying the stoppage of the engine, which means that the stoppage of the vehicle has occurred. Furthermore, the corresponding vehicle unit may be a locking unit of the driver's door of the vehicle, which can send a notification signal notifying the opening of the driver's door of the vehicle. After receiving the corresponding notification signal from the corresponding vehicle unit, the electronic control unit can send the remove signal to the control circuitry of the operating device. This in turn can trigger the pick-up message on the user interface of the operating device. For example, the pick-up message can be in a form of a display message ("Please pick-up your object from the compartment") and/or in a form of an audio signal. This is of advantage, because this enables the user to pick up the object at the time of his exit from the vehicle, since the user interface of the operating device lies within a field of view of the user while driving and/or stopping the vehicle. Hence, a reminder of a picking up of the object from the compartment is delivered to the user at the time of his exit from the vehicle.

In one embodiment, the object may be a mobile computing device, wherein the sensing unit may detect the object by reading a radio frequency identification code (RFID) on the object and/or by a radio signal. The mobile computing device may be a smartphone, a tablet computer, a navigation device, a laptop. By the term mobile computing unit, it is meant that the mobile computing unit is not a device that is integrated in the vehicle, rather it is an electronic unit or an electronic device which can be carried by the user into and out of the vehicle. When the mobile computing device is loaded into the compartment of the vehicle, the sensing unit detects the object by reading the RFID code and/or by a radio signal. This is of advantage, because this enables the user to load or place, for example, his smartphone in the compartment, which is at a distance close to a steering wheel of the vehicle and hence, can be reached by his hand while driving the vehicle.

In one embodiment, the sensing unit may be designed to send a connection signal to the control circuitry, wherein a display content of the object may be mapped onto the digital image of the object on the part of the user interface of the operating device. In other words, the sensing unit can send the connection signal to the control circuitry by a USB port, a CAN-bus, WLAN (Wireless Local Area Network), a Bluetooth, a MirrorLink or a wired interface. Hence, by the connection signal, the sensing unit can enable a transfer of information from the object, that is the mobile computing device, for example, a smartphone, to the control circuitry of the operating device. This in turn may enable the formation of a digital image of the object on a part of the user interface, such that the digital image corresponds to the size and dimension of a display panel of the smartphone on one side and that the display content of the object or the display content of the display panel of the smartphone is mapped onto the digital image of the object or display panel of the smartphone on the part of the user interface of the operating device on the other side. The digital image of the object or the display panel of the smartphone can include a multitude of icons of apps or logos, which are also displayed on the display panel of the smartphone. The apps or logos may be designed to activate different functionalities of the object, when they receive an input by a user, for example, by touch. In other words a digital replica of the display panel of the smartphone is generated as the digital image of the display panel of the smartphone on the part of the user interface of the operating device. This is of advantage, because the digital image of the object, for example, the display panel of the smartphone, on the part of the user interface can operate and/or be operated as the display of the object or the display panel of the smartphone itself.

In one embodiment, the part of the user interface displaying the digital image of the object may be designed to receive an object input signal and forward the object input signal to an object control unit of the object. In other words, an object input signal corresponding to an activation of a particular functionality of an app on the digital image of the object can be received by the user interface displaying the digital image of the object. The received object input signal by the user interface can be transmitted to the control circuitry of the operating device, which in turn may forward or transmit the object input signal to the object control unit of the object. This can enable the activation of the required functionality of the corresponding app of the object. This is of advantage, because can enable the usage and/or communication of the user with the object through the user interface of operating device.

In one embodiment, the control circuitry can be designed to receive an object output signal from the object and/or transmit the received output signal from the object to the user interface and/or to an output device of the vehicle, e.g., an infotainment unit. In other words, the object output control unit of the object can send an object output signal to the control circuitry of the operating device. The control circuitry then transmits the received object output signal from the object control unit of the object to the user interface of the operating device. The output of the object output signal can be controlled by the control circuitry, in such a way that the object output signal is outputted in the form of a visual signal and/or an audio signal and/or a haptic signal. Henceforth, communication with the object by the user via the operating device can realized.

In one embodiment, the compartment may include a charging unit, wherein the charging unit is designed to electrically charge the object loaded in the compartment. The electrically charging of the object may be by conduction or induction. This is of advantage, because this enables the object in the compartment to be charged electrically during the time in which the object is loaded in the compartment, that is during the time period in which the user or the driver of the vehicle is driving the vehicle and/or is present inside the vehicle.

The operating device for a vehicle includes a user interface designed to output at least one output signal on a part of the user interface. The output can be in form of a video signal and/or an audio signal and/or a haptic signal. Furthermore, the operating device has control circuitry designed to receive a detection signal from a sensing unit of the vehicle, wherein the detection signal detects a presence of an object. Furthermore, the control circuitry is designed to display a digital image of the object on a part of the user interface.

In one embodiment the user interface may be designed to receive an input signal on a part of the user interface and the control circuitry is designed to forward the input signal to an output device of the vehicle and/or to the electronic control unit of the vehicle. This is of advantage, because it enables the operating device to receive an input signal, for example, from a user in a vehicle, in order to communicate with another device in the vehicle.

BRIEF DESCRIPTION OF THE DRAWINGS

These and other aspects and advantages will become more apparent and more readily appreciated from the following description of an exemplary implementation, taken in conjunction with the accompanying drawings of which.

DETAILED DESCRIPTION

The embodiment explained in the following has described components that each represent individual features which are to be considered independently of each other and which each develop the invention independently of each other and thereby are also to be regarded as a component in an individual manner or in another than the shown combination. Furthermore, the described embodiment can also be supplemented by further features already described.

In the figures identical reference signs indicate elements that provide the same function.

Figure 1:
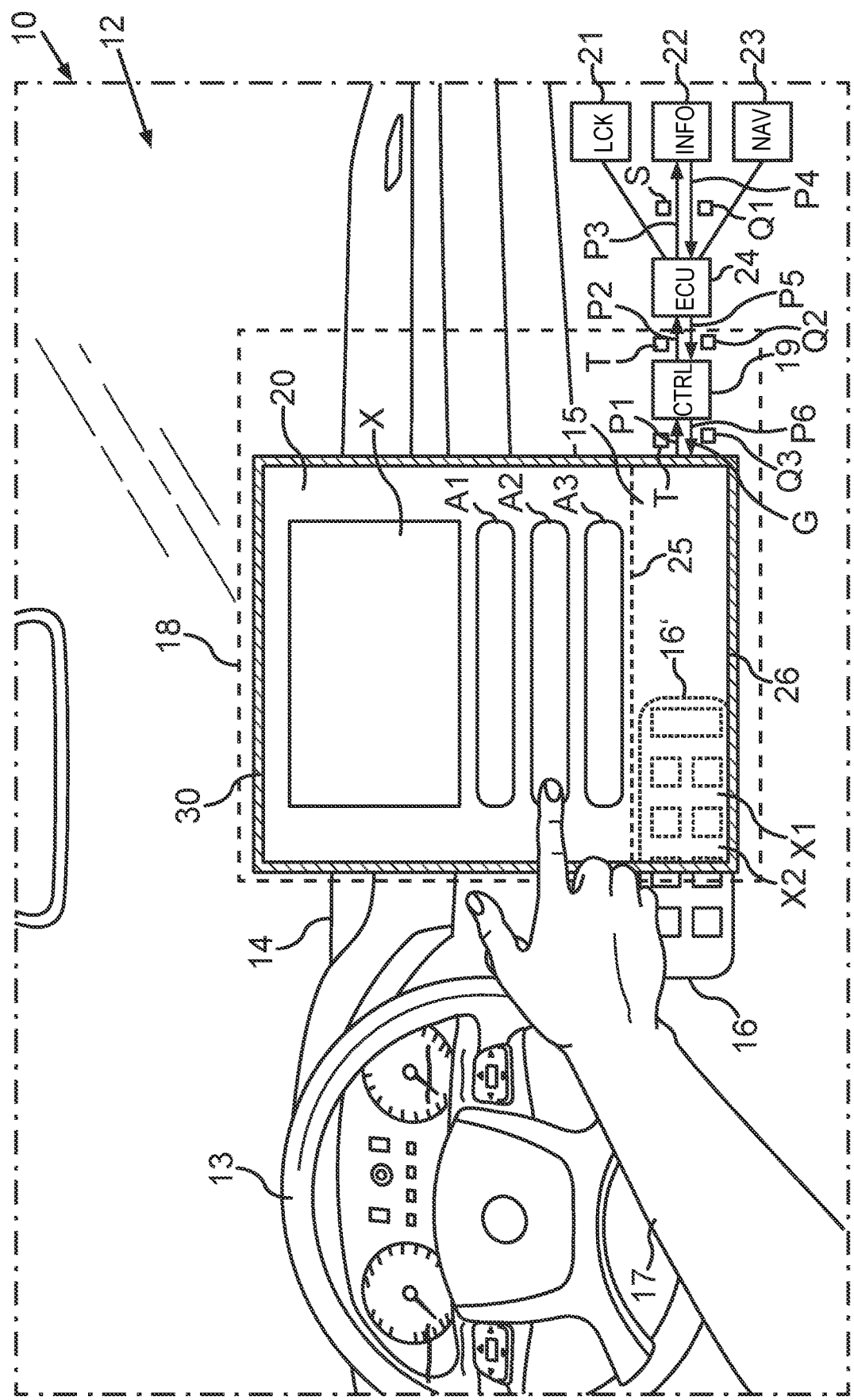
FIG. 1 is a schematic front view and block diagram of an embodiment of a vehicle having a compartment and an operating device.

FIG. 1 shows a schematic illustration of a vehicle 10, wherein the vehicle may be a personal vehicle which may be either driven manually or may be a self-driving vehicle. Furthermore, the vehicle may be a semi-autonomous vehicle. In the FIG. 1, a part of an interior cabin 12 of the vehicle 10 is depicted from a perspective of a view of a user, who can be the driver (not shown in figures) of the vehicle 10. Furthermore, a steering wheel 13 which can be used to maneuver the vehicle 10 by the user and a dashboard 14 of the vehicle 10 are depicted. The vehicle has a compartment 15. The compartment 15 can be in form of a hallow structure, which is designed in a region close to the steering wheel 13 in the dashboard 14 of the vehicle 10. The compartment 15 is designed to be loaded by an object 16. The location of the compartment 15 is chosen in such a manner that the compartment 15 is easily reachable by a hand 17 of the user. The object 16, that can be loaded in the compartment 15, can be a mobile computing device, for example a smartphone, a laptop or a think pad.

Figure 2:
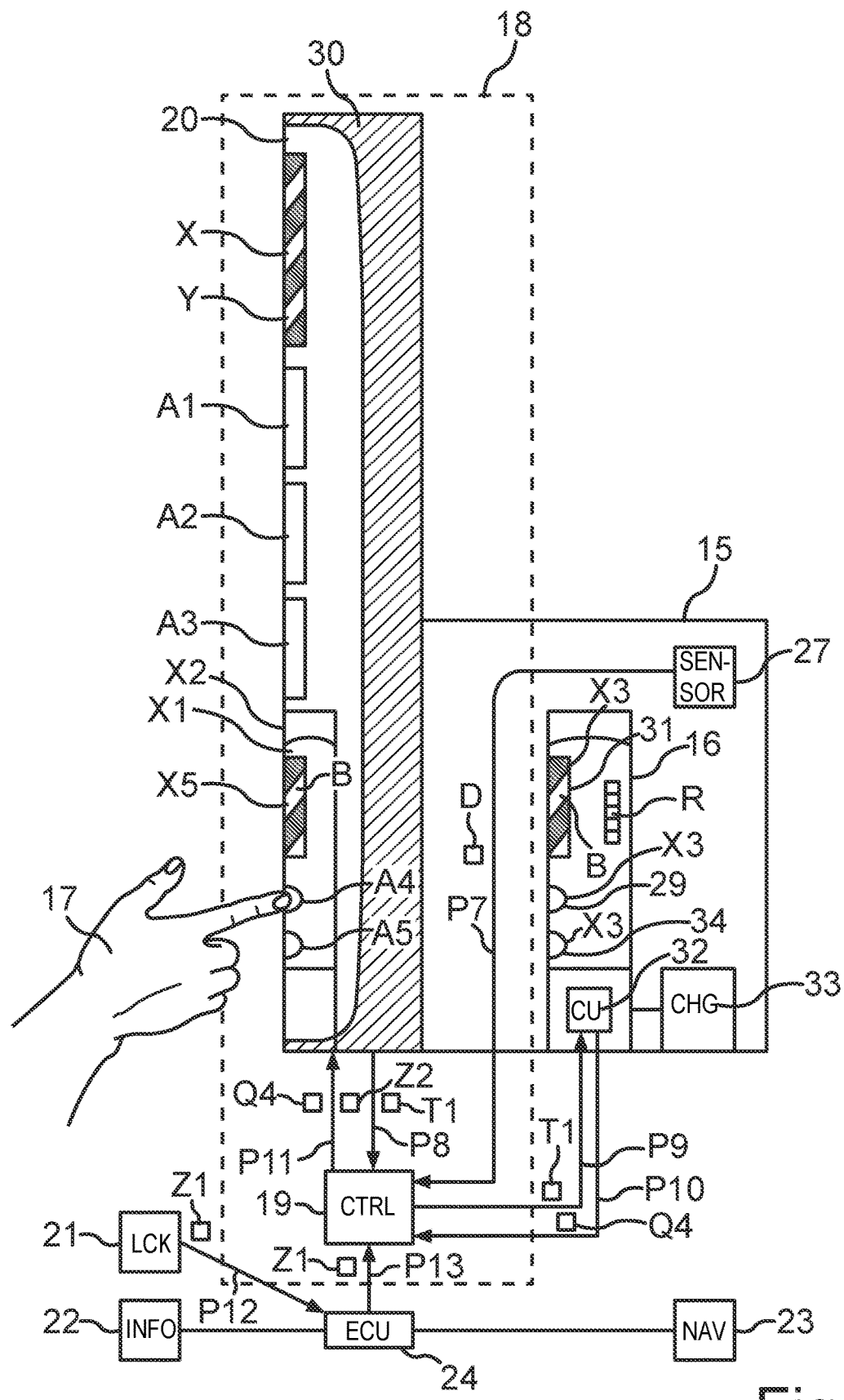
FIG. 2 a schematic side view and block diagram of an embodiment of a vehicle having an operating device and a compartment.

The vehicle 10 further includes an operating device 18, for example a touchscreen. The touchscreen may be an integral part of the vehicle 10 which can be arranged in front of the dashboard 14 by a handling arrangement (not shown in the figure). The operating device 18 can further include a user interface 20 and a casing 30. The user interface 20 may be a graphical user interface (GUI), which may has a plurality of pixel elements. The pixel elements of the user interface 20 can be excited by control circuitry 19 of the operating device 18. The control circuitry 19 may include a graphic card G, by which the control circuitry 19 can excite corresponding pixel elements of the user interface 20, in such a manner that at least one predetermined color may be radiated by the corresponding pixel element of the user interface 20. Hence, the control circuitry 19 can control the formation of different forms of digital images on the user interface 20. The different forms of digital images can be in the form of apps or logos corresponding to different functionalities of different devices of the vehicle 10. The different devices of the vehicle 10 are shown in FIG. 1 and FIG. 2 may be a locking unit 21, an infotainment unit 22 and a navigation unit 23. An app A1 may correspond to the locking unit 21, an app A2 may correspond to the infotainment unit 22 and an app A3 may correspond to the navigation unit 23.

The user interface 20 may be designed to receive an input signal T on a part of the user interface 20. The input signal T can be provided by the user, wherein the user can touch the corresponding part of the user interface 20, that is a corresponding app A1, A2 or A3. For example as shown in FIG. 1, the user may provide the input signal T by touching the app A2 with a finger of his hand 17. Hence, the user can be able to communicate with the infotainment unit 22, which corresponds to the app A2 on the user interface 20. It is further thinkable that the input signal T can be provided by the user by a voice input signal and/or by a gesture, in which the gesture may be captured by a camera and/or a proximity sensor (which are not shown in the figures). The input signal T provided by the user on the user interface 20 can be transmitted or forwarded to the control circuitry 19, as shown by a path P1. The control circuitry 19 can transmit or forward the input signal T to an electronic control unit 24 of the vehicle 10, as shown by a path P2.

The electronic control unit 24 is designed to send an activation signal S to the corresponding device, which in this case is the infotainment unit 22 in the vehicle 10, dependent on the input signal T. The transmission of the activation signal S from the electronic control unit 24 to the infotainment unit 22 can be enabled by a wireless connection or a wired connection, as shown by a path P3. Depending on the activation signal S the infotainment unit 22 sends an output signal Q1 to the electronic control unit 24, as shown by a path P4. The electronic control unit 24 can receive the output signal Q1 and can transform the output signal Q1 to an output signal Q2 and then, transmit the output signal Q2 to the control circuitry 19, as shown by the path P5. The control circuitry 19 can transform the received output signal Q2 to an output signal Q3 and transmit the output signal Q3 to the user interface 20, as shown by a path P6. The output signal Q3 can be a visual signal and/or an audio signal and/or a haptic signal. In other words, the electronic control unit 24 is designed to receive the output signal Q1 and transmit the received output signal Q1 from the infotainment unit 22 in the vehicle 10 to the user interface 20 of the operating device 18. The user interface 20 is designed to output the output signal Q3 on a part X of the user interface 20.

The operating device 18 is arranged in front of the compartment 15 and is designed to cover the compartment 15. In FIG. 1, the compartment 15 lies behind the operating device 18, in other words the compartment 15 is hidden behind the operating device 18. This is represented by a region bounded by a dashed line 25 and a lower side 26 of the casing 30 of the operating device 18. A depiction of the compartment 15 in FIG. 1 is made for the sake of understandability. However, the compartment 15 which is covered by the operating device 18 may be seen in a side view of the operating device 18 and the compartment 15, as shown in FIG. 2.

The compartment 15 can include a sensing unit 27, wherein the sensing unit 27 is designed to detect a presence of the object 16 when at least a part 16' of the object 16 is loaded or placed into the compartment 15. The sensing unit 27 detects the object 16 by reading an a radio frequency identification code R (RFID code) on the object 16 and/or by a radio signal. It is further thinkable, that the sensing unit 27 may detect the object 16 by a camera (not shown in the figure) which may be integrated in the compartment 15. The sensing unit 27 upon detection of the presence of the object 16 can send a detection signal D to the control circuitry 19 of the operating device 18. The control circuitry 19 is designed to receive the detection signal D from the sensing unit 27 of the vehicle 10, wherein the detection signal D indicates a presence of the object 16 in the compartment 15. The detection signal D can be transmitted from the sensing unit 27 to the control circuitry by a wireless connection and/or a wired connection, as shown by a path P7.

Upon receiving the detection signal D, the control circuitry 19 may excite a plurality of the pixel elements of the user interface 20, which in turn may display a digital image X1 of the object 16 on a part X2 of the user interface 20. The digital image X1 can be obtained by a camera (not shown in figure) which may be incorporated either in the compartment 15 or may be a part of the operating device 18. A Display content X3 of the object 16 can be mapped on to the digital image X1 of the object 16 on the part X2 of the user interface 20 of the operating device 18.

Furthermore, the mapping of the display content X3 of the object 16, which in this case is the smartphone, onto the digital image X1 of the object 16 on the part X2 of the user interface 20, can be realized by a USB connection and/or a Bluetooth and/or a MirrorLink technology. It is further thinkable, that a login profile of a user of the smartphone, that is the object 16, can be stored in the control circuitry 19, such that when the smartphone, that is the object 16, is loaded into the compartment 15, then the login profile of the user is identified by the control circuitry 19 and the display content X3 of the object 16, that is the smartphone of the user, is mapped onto the digital image X1 of the object 16.

The part X2 of the user interface 20 displaying the digital image X1 of the object 16 is designed to receive an object input signal T1, for example by a touch signal. For example, the touch signal is provided by the user by touching the corresponding app A4 on the digital image X1 by the finger of his hand 17. The app A4 on the digital image X1 can correspond to the app 29 of the display content X3 of the object 16. Similarly, an app A5 on the digital image X1 of the object 16 can correspond to an app 34 of the display content X3 of the object 16. Similarly, a digital object output panel X5 on the digital image X1 may correspond to an object output panel 31 of the display content X3 of the object 16. When the finger of the hand 17 of the user touches the app A4, an object input signal T1 is sent to the control circuitry 19, as shown by a path P8. In other words, the part X2 of the user interface 20 displaying the digital image X1 of the object 16 is designed to receive the object input signal T1 and transmit or forward the object input signal T1 to the control circuitry 19, which in turn transmits or forwards the object input signal T1 to an object control unit 32 of the object 16, as shown by a path P9. Hence, the user can communicate with the object 16 via the user interface 20 by sending the object input signal T1 by touching the app A4 in order to communicate with the app 29 of the object 16.

After receiving the object input signal T1, the object control unit 32 sends an object output signal Q4, which may correspond to an output from an app 29 of the object 16, to the control circuitry 19 via a path P10. After receiving the object output signal Q4, the control circuitry 19 can transmit or forward the object output signal Q4 to the user interface 20 via a path P11. An output corresponding to the object output signal Q4 can be outputted on the region X5 of the digital image X1 of the object 16. The output outputted on the region X5 corresponds to the output which would mirror the output displayed on the object output panel 31 of the display content X3 of the object 16. For the sake of understandability, a pattern B depicted on the region X5 and the object output panel 31, is shown to be identical, this is to represent that the output on the digital image X1 is identical to the output which would have been displayed on the object output panel 31 of the display content X3 of the object 16 upon the application or activation of the app 29 of the object 16. It is thinkable, that the digital image X1 of the object 16 can be scaled to a different length scale, as it can be performed by an ordinary skilled person in the related field.

The compartment 15 includes a charging unit 33, wherein the charging unit 33 can be designed to electrically charge the loaded object 16 in the compartment 15. The charging of the object 16 can occur by induction and/or conduction.

The operating device 18 can be designed to output a pick-up message of the loaded object 16 in the compartment 15 on the user interface 20. For example, upon a stoppage of the vehicle 10, the locking unit 21 can send a remove signal Z1 to the electronic control unit 24 via a path P12. The electronic control unit 24 can receive the remove signal Z1 from the locking unit 21 and can transmit or forward the remove signal Z1 to the control circuitry 19 via a path P13. The control circuitry 19 can transform the remove signal Z1 to an output remove signal Z2 and can transmits the output remove signal Z2 to the user interface 20. The output remove signal Z2 can be outputted on the output panel X as an output Y. The output Y can be in form of the pick-up message which can be outputted as a visual signal and/or an audio signal and/or a haptic signal. Furthermore, the remove signal Z1 can be sent from an engine unit and/or other units or devices of the vehicle 10 which could detect a stoppage of the vehicle 10 and/or an opening of a driver's door of the vehicle 10.

Overall, the example shows how the storing of the object 16 and enabling a visualization of the object 16 on a user interface 20 of the operating device 18 in a vehicle 10 can be obtained.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A vehicle, comprising:
a compartment configured to receive an object;
an operating device including
a display with a user interface, arranged in front of the compartment and covering the compartment, and
control circuitry configured to display a digital image of the object with a digital replica of a screen of the object on a part of the user interface and to output a pick-up message, regarding the object in the compartment, on the user interface when a user is detected exiting the vehicle; and
a sensor configured to detect a presence of the object when at least a portion of the object is in the compartment.

2. A vehicle according to claim 1, further comprising:
a driver's door, and
an electronic control unit configured to send a remove signal to the control circuitry to trigger the pick-up message, when at least one of a stoppage of the vehicle and an opening of the driver's door of the vehicle is detected.

3. A vehicle according to claim 2, wherein the object is a mobile computing device, and
wherein the sensor detects the object by at least one of reading a radio-frequency identification code on the object and by a radio signal.

4. A vehicle according to claim 3,
wherein the sensor is configured to send a connection signal to the control circuitry, and
wherein display content on the object is mapped onto the digital image of the object on the part of the user interface of the operating device.

5. A vehicle according to claim 4, wherein the object has an object control unit, and
wherein the control circuitry is configured to receive, at the part of the user interface displaying the digital image of the object, an object input signal and forward the object input signal to the object control unit of the object.

6. A vehicle according to claim 5,
further comprising an output device, and
wherein the control circuitry is configured to receive an object output signal from the object and transmit the object output signal received from the object to at least one of the user interface and the output device of the vehicle.

7. A vehicle according to claim 6, wherein the compartment includes a charger configured to electrically charge the object in the compartment.

8. A vehicle according to claim 1, wherein the object is a mobile computing device, and
wherein the sensor detects the object by at least one of reading a radio-frequency identification code on the object and by a radio signal.

9. A vehicle according to claim 8,
wherein the sensor is configured to send a connection signal to the control circuitry, and
wherein display content on the object is mapped onto the digital image of the object on the part of the user interface of the operating device.

10. A vehicle according to claim 1, wherein the object has an object control unit, and
wherein the control circuitry is configured to receive, at the part of the user interface displaying the digital image of the object, an object input signal and forward the object input signal to the object control unit of the object.

11. A vehicle according to claim 1,
further comprising an output device, and
wherein the control circuitry is configured to receive an object output signal from the object and transmit the object output signal received from the object to at least one of the user interface and the output device of the vehicle.

12. A vehicle according to claim 1, wherein the compartment includes a charger configured to electrically charge the object in the compartment.

13. An operating device for a vehicle having a compartment with a sensor, comprising:
a display with a user interface, arranged to cover the compartment; and
control circuitry, configured to
output at least one output signal on a first part of the user interface,
receive a detection signal from the sensor of the vehicle indicating a presence of an object in the compartment,
display a digital image of the object with a digital replica of a screen of the object on a second part of the user interface, and
output a pick-up message, regarding the object in the compartment, on the user interface when a user is detected exiting the vehicle.

14. An operating device according to claim 13, wherein the vehicle has at least one of an output device and an electronic control unit, and
wherein the control circuitry is configured to receive, from the user interface, an input signal on a third part of the user interface and forward the input signal to the at least one of the output device of the vehicle and the electronic control unit of the vehicle.

15. An operating device according to claim 14, wherein the vehicle has a driver's door, and
wherein the operating device is configured to output the pick-up message, regarding the object in the compartment, on the user-interface in response to a remove signal sent by the electronic control unit of the vehicle to the control circuitry when at least one of a stoppage of the vehicle and an opening of the driver's door of the vehicle is detected.

16. An operating device according to claim 13, wherein the object has an object control unit, and
wherein the control circuitry is configured to receive, at the second part of the user-interface displaying the digital image of the object, an object input signal and forward the object input signal to the object control unit of the object.

17. An operating device according to claim 13, wherein the vehicle has an output device, and
wherein the control circuitry is configured to receive an object output signal from the object and transmit the object output signal received from the object to at least one of the user-interface and the output device of the vehicle.

* * * * *

UNITED STATES PATENT AND TRADEMARK OFFICE
CERTIFICATE OF CORRECTION

PATENT NO. : 11,820,231 B2  
APPLICATION NO. : 17/416100  
DATED : November 21, 2023  
INVENTOR(S) : Daniel Lottes et al.

Page 1 of 1

It is certified that error appears in the above-identified patent and that said Letters Patent is hereby corrected as shown below:

In the Specification

Column 1, Lines 11-12, delete "Dec. 16, 2018." And insert --Dec. 19, 2018.--.

Signed and Sealed this  
Second Day of January, 2024

Katherine Kelly Vidal  
*Director of the United States Patent and Trademark Office*